UNITED STATES PATENT OFFICE.

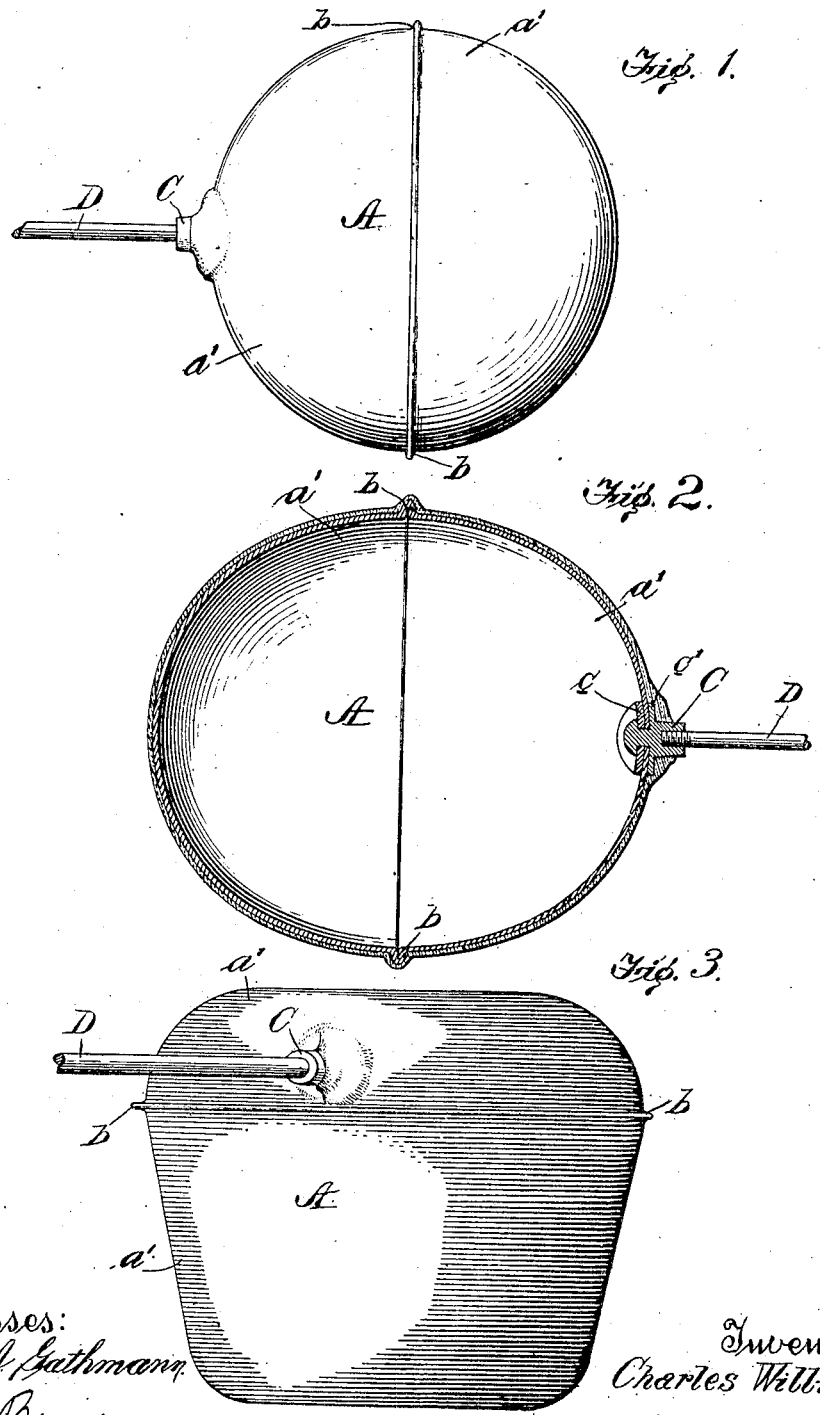

CHARLES WILLMS, OF BALTIMORE, MARYLAND.

TANK-FLOAT.

No. 849,707.　　　Specification of Letters Patent.　　　Patented April 9, 1907.

Application filed July 28, 1905. Serial No. 271,623.

*To all whom it may concern:*

Be it known that I, CHARLES WILLMS, a citizen of the United States, residing in the city of Baltimore and State of Maryland, have invented certain new and useful Improvements in Tank-Floats, of which the following is a specification.

Tank-floats have heretofore been made of various materials, such as glass or metal. Glass floats have not sufficient strength to stand the wear and tear of an ordinary flushing-tank and if made too thick are liable to crack from the expansion and contraction of the glass, as well as from other causes. Metallic floats if unprotected are soon destroyed by the corrosive action of alkalies found in the native waters of many parts of the country.

It is the object of my invention to provide a strong light float which will resist the action of acids or alkalies, as well as accidents of use.

To this end my invention consists in providing a hermetically-sealed thin float of metal and coating or enameling it with glass or similar substance to seal it hermetically and protect it from corrosion.

The accompanying drawings represent floats embodying my improvements in the way best known to me, Figure 1 being a side elevation, Fig. 2 a central transverse section therethrough, and Fig. 3 a modified form.

I construct the float A of sections $a'$, of thin pressed metal, preferably malleable iron or steel. The edges $b$ of the section are made to interlock or overlap and when pressed together form a water-tight joint. A hole is made in one section of the float, preferably at a point removed from the line of junction of the sections, and an interiorly-threaded stud C is inserted in this opening. The float is tightly clamped between an internal reinforcing-collar $c$ and an external flange $c'$ on the stud. The lever or arm D of the float is secured to this stud. Great pressure is exercised in usual well-known ways in clamping these parts together so as to form a water-tight joint. When this is done, the surface of the float is smoothed mechanically in usual well-known ways and inserted in a pickling-bath to prepare the surface for receiving the final coat of glass or enamel. It is essential that the seams uniting the section and the joint upon the stud should be tight enough to withstand the pickling-bath for a considerable time, so that none of the pickling material gets into the interior of the float. After the pickling-bath the float is treated with a covering of unfused glass or enamel in a pasty state. This is applied rather thickly. The float is put into a baking-oven and the enamel fused so as to cover the entire surface of the float, including the joints, with a coating which is not acted upon by acids, alkalies, or other impurities ordinarily found in water.

Figs. 1 and 2 show a spheroidal-shaped float, with the stud to which the lever-arm D is secured at one end, while Fig. 3 shows a float of a different shape, with the lever-arm inserted in one side of one of the sections near the joint. I thus by my improvement secure a strong, efficient, and durable float.

I claim as my invention—

1. A tank-float consisting of the combination substantially as hereinbefore set forth of thin sections of sheet metal, a stud passing through an opening in one of the sections, reinforcing-flanges on the exterior and interior of the float embracing the stud and float and a coating of enamel which hermetically seals the joint.

2. A hermetically-sealed tank-float consisting of the combination of sheet-metal sections united by a hermetically-sealed joint, a stud for the lever-arm passing through one of the sections, reinforcing clamping-flanges on the stud embracing the float, and a coating of enamel entirely enveloping the float.

In testimony whereof I have hereunto subscribed my name.

CHARLES WILLMS.

Witnesses:
　W. D. BALDWIN,
　K. H. FENNING.